United States Patent Office 2,868,788
Patented Jan. 13, 1959

2,868,788
POLYHALOCYCLOALKENIC DERIVATIVES OF DIALKENYL MELAMINES

John P. Luvisi, Park Ridge, Ill., assignor to Universal Oil Products Company, Des Plaines, Ill., a corporation of Delaware No Drawing. Application May 28, 1957
Serial No. 662,019
14 Claims. (Cl. 260—249.6)

This invention relates to new compositions of matter which may be used as insecticides and to a method for the preparation thereof. More specifically, the invention relates to a method for the preparation of polyhalocycloalkenic derivatives of dialkenyl melamines.

It is an object of this invention to prepare polyhalocycloalkenic derivatives of dialkenyl melamines which may be used as insecticides.

One embodiment of this invention is found in a process for the preparation of an N-polyhalocycloalkenic derivative of a dialkenyl melamine which comprises reacting a dialkenyl melamine with an unsaturated compound selected from the group consisting of polyhaloalkadienes and polyhalocycloalkadienes at an elevated temperature, and recovering the resultant N-polyhalocycloalkenic derivative of a dialkenyl melamine.

A further embodiment of the invention resides in a process for the preparation of an N-polyhalocycloalkenic derivative of a dialkenyl melamine which comprises reacting a dialkenyl melamine with a polyhalocycloalkadiene at a temperature in the range of from about 100° to about 200° C., and recovering the resultant N-polyhalocycloalkenic derivative of a dialkenyl melamine.

A specific embodiment of the invention is found in a process for the preparation of an N-polyhalocycloalkenic derivative of a dialkenyl melamine which comprises reacting a dialkenyl melamine with hexachlorocyclopentadiene at a temperature in the range of from about 100° to about 200° C., and recovering the resultant N-polyhalocycloalkenic derivative of a dialkenyl melamine.

A more specific embodiment of the invention is found in a process for the preparation of an N-polyhalocycloalkenic derivative of a dialkenyl melamine which comprises reacting one molecular proportion of N,N-divinyl melamine with one molecular proportion of hexachlorocyclopentadiene at a temperature in the range of from about 100° to about 200° C., and recovering the resultant N - vinyl - N - (1,4,5,6,7,7 - hexachloro - 5 - norbornen - 2 - yl) - melamine.

Yet another embodiment of the invention is found in an N-polyhalocycloalkenic derivative of a dialkenyl melamine.

Other objects and embodiments referring to alternative polyhaloalkadienes and polyhalocycloalkadienes and alternative dialkenyl melamines will be found in the following further detailed description of the invention.

It has now been discovered that N-polyhalocycloalkenic derivatives of dialkenyl melamines may be prepared by reacting a dialkenyl melamine with a polyhaloalkadiene or polyhalocycloalkadiene at elevated temperatures. For purposes of this invention the term "polyhalocycloalkadiene derivative" when used herein in the specification and claims will refer to cycloalkenic, dicycloalkenic, bicycloalkenic and dibicycloalkenic polyhalogenated derivatives of a dialkenyl melamine. The resultant compounds find a wide variety of uses in the chemical field. For example, the condensation product of the reaction between hexachlorocyclopentadiene and N,N-diallyl melamine which is N-allyl-N-(1,4,5,6,7,7-hexachloro-5-norbornen-2-ylmethyl)melamine may be used as an insecticide, especially against houseflies. In addition, the reaction products of this invention may also be used as oxidation inhibitors or as intermediates in the preparation of resins, pharmaceuticals, plastics, etc.

The process of this invention in which a polyhaloalkadiene or polyhalocycloalkadiene is condensed with a dialkenyl melamine will take place at an elevated temperature in the range of from about 50° to about 300° C. or more, and often preferably at a temperature in the range of from about 100° to about 200° C., the temperature depending upon the activity of the dialkenyl melamine used. In addition, if so desired, superatmospheric pressures ranging from about 2 atmospheres to about 100 atmospheres or more may also be used, the pressures used being sufficient to maintain at least a portion of the starting materials in the liquid phase. When the reactants consisting of a dialkenyl melamine and a polyhaloalkadiene or a polyhalocycloalkadiene are reacted in a 1:1 molecular ratio the resulting compound will comprise an N-cycloalkenic derivative of the dialkenyl melamine; if said reactants are reacted in a molecular ratio of one molecular proportion of the dialkenyl melamine to two molecular proportions of the polyhaloalkadiene or polyhalocycloalkadiene the resulting compound will comprise an N,N-bis-polyhalocycloalkenic derivative of the dialkenyl melamine.

It is also contemplated within the scope of this invention that this process may be carried out in the presence of an inert organic solvent, said solvents including saturated paraffins such as pentane, hexane, heptane, etc.; aromatic hydrocarbons such as benzene, toluene, o-, m- and p-xylene, ethyl benzenes, etc.; alcohols such as methyl alcohol, ethyl alcohol, propyl alcohol, etc.; ethers such as dimethyl ether, diethyl ether, dipropyl ether, etc.; or acetone, acetic acid, dioxane, etc.

Dialkenyl melamines which may be used in the process of this invention are those having the general formula:

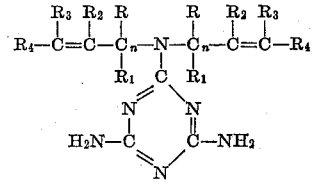

in which the R's independently represent hydrogen or an alkyl radical containing from 1 to 6 carbon atoms and $n$ is a number from 1 to 6, suitable compounds including N,N-divinyl melamine, N, N-diallyl melamine, N, N-dimethallyl melamine, N, N-dicrotonyl melamine, N, N-dipentenyl melamine, N,N-di(1-methyl-4-pentenyl)-melamine, N,N-di(2-methyl-4-pentenyl)melamine, N,N-di(1,2-dimethyl-4-pentenyl)melamine, N,N-di(2,3-dimethyl - 4 - pentenyl)melamine, N,N - di(1 - methyl - 3 - pentenyl)melamine, N,N - di(2 - methyl - 3 - pentenyl)- melamine, N,N-di(3-methyl-3-pentenyl)melamine, N,N-di(1,2 - dimethyl - 3 - pentenyl)melamine, N,N - di(2,3-dimethyl - 3 - pentenyl)melamine, N,N - di(1 - methyl - 2 - pentenyl)melamine, N,N - di(2 - methyl - 2 - pentenyl)melamine, N,N - di(3 - methyl - 2 - pentenyl)melamine, N,N-di(1,2-dimethyl-2-pentenyl)melamine, N,N-di(2,3-dimethyl-2-pentenyl)melamine, N,N-di(3-hexenyl)-melamine, N,N-di(4-hexenyl)melamine, N,N-di(5-hexenyl)melamine, N,N-di(1-methyl-3-hexenyl)melamine, N,N-di(2-methyl-3-hexenyl)melamine, N,N-di(3-methyl-3-hexenyl)melamine, N,N-di(4-methyl-3-hexenyl)melamine, N,N-di(5-methyl-3-hexenyl)melamine, N, N-di(1-methyl-4-hexenyl)melamine, N,N-di(2-methyl-4-hexenyl)-melamine, N,N-di(3-methyl-4-hexenyl)melamine, N, N-di(4- methyl-4-hexenyl)melamine, N,N-di(5-methyl-4-hexenyl)melamine, N,N-di(1-methyl-5-hexenyl)melamine, N,N-di(2-methyl-5-hexenyl)melamine, N,N-di(3-methyl- 5-hexenyl)melamine, N,N-di(4-methyl-5-hexenyl)melamine, N,N-di(5-methyl-5-hexenyl)melamine, N,N-di(1-heptenyl)melamine, N,N-di(2-heptenyl)melamine, N,N-di(3-heptenyl)melamine, N, N-di(4-heptenyl)melamine, N,N-di(5-heptenyl)melamine, N,N-di(1-methyl-1-heptenyl)melamine, N,N-di(2-methyl-1-heptenyl)melamine, N,N-di(3-methyl-1-heptenyl)melamine, N,N-di(4-methyl-1-heptenyl)melamine, N,N-di(5-methyl-1-heptenyl)melamine, N,N-di(6-methyl-1-heptenyl)melamine, N,N-di(1-methyl-2-heptenyl)melamine, N,N-di(2-methyl-2-heptenyl)melamine, N,N-di(3-methyl-2-heptenyl)melamine, N,N-di(4-methyl-2-heptenyl)melamine, N,N-di(5-methyl-2-heptenyl)melamine, N,N-di(6-methyl-2-heptenyl)melamine, N,N-di(1-methyl-3-heptenyl)melamine, N,N-di(2-methyl-3-heptenyl)melamine, N,N-di(3-methyl-3-heptenyl)melamine, N,N-di(4-methyl-3-heptenyl)melamine, N,N-di(5-methyl-3-heptenyl)melamine, N,N-di(6-methyl-3-heptenyl)melamine, N,N-di(1-methyl-4-heptenyl)melamine, N,N-di(2-methyl-4-heptenyl)melamine, N,N-di(3-methyl-4-heptenyl)melamine, N,N-di(4-methyl-4-heptenyl)melamine, N,N-di(5-methyl-4-heptenyl)melamine, N,N-di(6-methyl-4-heptenyl)melamine, N,N-di(1-methyl-5-heptenyl)melamine, N,N-di(2-methyl-5-heptenyl)melamine, N,N-di(3-methyl-5-heptenyl)melamine, N,N-di(4-methyl-5-heptenyl)melamine, N,N-di(5-methyl-5-heptenyl)melamine, N,N-di(6-methyl-5-heptenyl)melamine, N,N-di(1-methyl-6-heptenyl)melamine, N,N-di(2-methyl-6-heptenyl)melamine, N,N-di(3-methyl-6-heptenyl)melamine, N,N-di(4-methyl-6-heptenyl)melamine, N,N-di(5-methyl-6-heptenyl)melamine, N,N-di(6-methyl-6-heptenyl)melamine, etc. It is also contemplated within the scope of this invention that mixed dialkenyl melamines may also be used although not necessarily with equivalent results, said melamines including N-vinyl-N-allyl melamine, N-vinyl-N-methallyl melamine, N-vinyl-N-crotonyl melamine, N-vinyl-N-pentyl melamine, N-vinyl-N-hexenyl melamine, N-vinyl-N-heptenyl melamine, N-allyl-N-methyallyl melamine, N-allyl-N-crotonyl melamine, N-allyl-N-pentenyl melamine, N-vinyl-N-(1-methyl-1-pentyl)melamine, N-vinyl-N-(2-methyl-1-pentyl)melamine, N-vinyl-N-(3-methyl-1-pentenyl)melamine, N-vinyl-N-(4-methyl-1-pentenyl)melamine, N-vinyl-N-(1-methyl-2-pentenyl)melamine, N-vinyl-N-(2-methyl-1-hexenyl)melamine, N-vinyl-N-(3-methyl-3-hexenyl)melamine, N-vinyl-N-(4-methyl-5-heptenyl)melamine, N-allyl-N-(1-methyl-1-pentenyl)melamine, N-allyl-N-(2-methyl-1-pentenyl)melamine, N-allyl-N-(3-methyl-1-pentenyl)melamine, N-allyl-N-(4-methyl-1-pentenyl)melamine, N-allyl-N-(1-methyl-2-pentenyl)melamine, N-allyl-N-(2-methyl-1-hexenyl)melamine, N-allyl-N-(3-methyl-3-hexenyl)melamine, N-allyl-N-(4-methyl-5-heptenyl)melamine, N-crotonyl-N-(1-methyl-1-pentenyl)melamine, N-crotonyl-N-(2-methyl-1-pentenyl)melamine, N-crotonyl-N-(3-methyl-1-pentenyl)melamine, N-crotonyl-N-(4-methyl-1-pentenyl)melamine, N-crotonyl-N-(1-methyl-2-pentenyl)melamine, N-crotonyl-N-(2-methyl-1-hexenyl)melamine, N-crotonyl-N-(3-methyl-3-hexenyl)melamine, N-crotonyl-N-(4-methyl-5-heptenyl)melamine, etc. It is to be understood that the aforementioned dialkenyl melamines are only representatives of the class of compounds which may be used, and that the process of this invention is not necessarily limited thereto.

Polyhaloalkadienes and polyhalocycloalkadienes which may be condensed with the aforementioned dialkenyl melamines are those in which the polyhaloalkadiene has the formula:

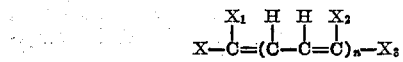

in which the X's are independently selected from hydrogen and halogen radicals having an atomic weight of between 19 and 80 (i. e. fluorine, chlorine or bromine), at least 2 of the X's being halogen and $n$ is an integer of from 1 to about 6. Examples of polyhaloalkadienes which may be used include 1,4-dichloro-1,3-butadiene, 1,4-dibromo-1,3-butadiene, 1,4-difluoro-1,3-butadiene, 1,1,4-trichloro-1,3-butadiene, 1,1,4-tribromo-1,3-butadiene, 1,1,4-trifluoro-1,3-butadiene, 1,1,4,4-tetrachloro-1,3-butadiene, 1,1,4,4-tetrabromo-1,3-butadiene, 1,-1,4,4-tetrafluoro-1,3-butadiene, 1,5-dichloro-1,3-butadiene, 1,5-dibromo-1,3-butadiene, 1,5-difluoro-1,3-butadiene, 1,-4-dichloro-1,4-pentadiene, 1,4-dibromo-1,4-pentadiene, 1,4-difluoro-1,4-pentadiene, 1,1,4-dichloro-1,4-pentadiene, 1,1,4-dibromo-1,4-pentadiene, 1,1,4-difluoro-1,4-pentadiene, 1,1,4,4-tetrachloro-1,4-pentadiene, 1,1,4,4-tetrabromo-1,4-pentadiene, 1,1,4,4-tetrafluoro-1,4-pentadiene, 1,5-dichloro-1,4-pentadiene, 1,5-dibromo-1,4-pentadiene, 1,5-difluoro-1,4-pentadiene, 1,4-dichloro-1,5-hexadiene, 1,4-dibromo-1,5-hexadiene, 1,4-difluoro-1,5-hexadiene, 1,1,4-trichloro-1,5-hexadiene, 1,1,4-tribromo-1,5-hexadiene, 1,1,4-trifluoro-1,5-hexadiene, 1,1,4,4-tetrachloro-1,5-hexadiene, 1,1,4,4-tetrabromo-1,5-hexadiene, 1,1,4,4-tetrafluoro-1,5-hexadiene, 1,5-dichloro-1,5-hexadiene, 1,5-dibromo-1,5-hexadiene, 1,5-difluoro-1,5-hexadiene, etc.

Polyhalocycloalkadienes which may be condensed with the aforementioned aromatic compounds include 1,2-dichlorocyclopentadiene, 1,2,3-trichlorocyclopentadiene 1,2,3,4-tetrachlorocyclopentadiene, 1,2,3,4,5-pentachlorocyclopentadiene, hexachlorocyclopentadiene, 1,2-dibromocyclopentadiene, 1,2,3-tribromocyclopentadiene, 1,2,3,4-tetrabromocyclopentadiene, 1,2,3,4,5-pentabromocyclopentadiene, hexabromocyclopentadiene, 1,2-difluorocyclopentadiene, 1,2,3-trifluorocyclopentadiene, 1,2,3,4-tetrafluorocyclopentadiene, 1,2,3,4,5-pentafluorocyclopentadiene, hexafluorocyclopentadiene, etc. Polyhalo substituted conjugated cyclohexadienes such as 1,2-dichloro-1,3-cyclohexadiene, 1,2,3-dichloro-1,3-cyclohexadiene, octachloro-1,3-cyclohexadiene, etc., 1,2-dibromo-1,3-cyclohexadiene, octabromo-1,3-cyclohexadiene, etc., may also be used. However, the preferred polyhalocycloalkadiene comprises a polyhalocyclopentadiene due to its greater availability and relatively lesser cost. In addition, it is also contemplated within the scope of this invention that the polyhalocycloalkadienes which are used in this process may contain more than one species of halogen substituents such as, for example, 1-chloro-2-bromocyclopentadiene, 1,2-dichloro-3-bromocyclopentadiene, 1,2-dichloro-5,5-dibromocyclopentadiene, etc., although the use of these compounds are not necessarily for equivalent results.

An example of the condensation process may be illustrated by the following equation in which one molecular proportion of a dialkenyl melamine is reacted with one molecular proportion of hexachlorocyclopentadiene to form the N-polyhalocycloalkenic derivative of the dialkenyl melamine:

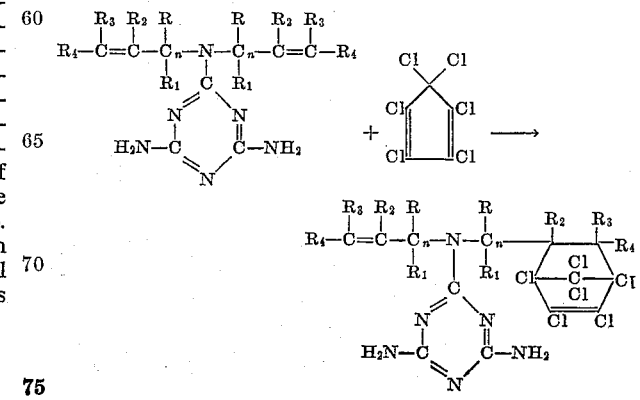

Likewise the reaction between one molecular proportion of a dialkenyl melamine and two molecular proportions of a polyhalocycloalkadiene such as hexachlorocyclopentadiene to form an N,N-bis-polyhalocycloalkenic derivative of the dialkenyl melamine is illustrated by the following equation:

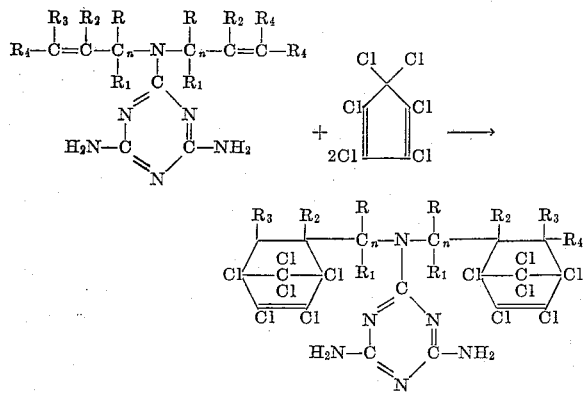

The physical properties of the present N-polyhalocycloalkenic derivatives of dialkenyl melamines and the effects they have on entomological forms of life make them particularly desirable as insecticides and insect repellents, the compounds having many of the features desired of materials of this purpose. They are, for example, toxic to insects which are destructive to plant life and materials normally subject to insect infestation, their toxic effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent further use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as surface active agent, to the mixture of components. The latter solvents and dispersants may also be employed for the specific purpose of reducing the concentration of insecticide to the to the desired level in a specific insecticide formulation, the particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The process of this invention may be effected in any suitable manner and may comprise either a batch or a continuous type operation. For example, when a batch type operation is used a quantity of the starting materials comprising a dialkenyl melamine, a polyhaloalkadiene or a polyhalocycloalkadiene and, if so desired, an inert organic solvent is placed in a condensation apparatus provided with heating and mixing means. The apparatus, which may comprise a flask, is heated at the desired temperature for a predetermined period of time. At the end of this time the flask and contents thereof are allowed to cool to room temperature and the desired reaction product separated from unreacted starting materials and/or by-products, by conventional means such as fractional distillation, crystallization, etc. Alternatively, the dialkenyl melamine and solvent, if any, may be heated at the desired reaction temperature and the polyhaloalkadiene or polyhalocycloalkadiene may be added gradually thereto.

Another method of effecting the condensation reaction of the present invention is by a continuous type operation. In this type of operation the starting materials comprising the dialkenyl melamine and the polyhaloalkadiene or polyhalocycloalkadiene are continuously charged to a reactor which is maintained at the proper operating conditions of temperature and pressure. The reactor may comprise an unpacked vessel or coil, or may be lined with an adsorbent packing material such as fire brick, alumina, dehydrated bauxite or the like. If so desired, an inert organic solvent of the type hereinbefore set forth may be added through a separate line or admixed with one or both of the starting materials prior to entry into said reactor and charged thereto in a single line. The reaction product is continuously withdrawn from the reactor, separated from the reactor effluent and purified by conventional means hereinbefore set forth, while the unreacted starting materials are separated and recharged to the reactor as a portion of the feed stock.

The following examples are given to illustrate the process of the present invention, which, however, are not intended to limit the generally broad scope of the present invention in strict accordance therewith.

*Example I*

A solution of 20 g. (0.1 mole) of N,N-diallylmelamine and 27 g. (0.1 mole) of hexachlorocyclopentadiene in about 100 g. of dioxane was heated under reflux at about 100° C. for about 8 hours after which the reactants were refluxed for an additional 3.5 hours, the dioxane being gradually distilled off, permitting the temperature of the solution to rise from about 106° C. to about 145° C. At the end of this time the flask and contents thereof were cooled to room temperature and the reaction product, comprising 34 g. of a dark amber material soluble in alcohol and dioxane was recovered, taken up in pentane, washed with dilute aqueous sodium bicarbonate and water and dried. The product is distilled under reduced pressure, the cut comprising N-allyl-N-(1,4,5,6,-7,7-hexachloro-5-norbornen-2-ylmethyl)melamine being separated therefrom.

*Example II*

A solution of 20 g. of N,N-divinylmelamine and 27 g. of hexachlorocyclopentadiene in 100 g. of xylene is heated under reflux at a temperature of about 100° C. for a period of about 8 hours during which time the xylene is distilled over until the reaction temperature reaches a maximum of about 150° C. At the end of this time the flask and contents thereof are cooled to room temperature and the reaction product is washed, dried and subjected to fractional distillation under reduced pressure. The desired product, comprising N-vinyl-N-(1,4,5,6,7,7-hexachloro-5-norbornen-2-yl)melamine, is separated therefrom.

*Example III*

A solution of 20 g. of N,N-divinylmelamine and 12 g. of 1,4-dichloro-1,3-butadine in 100 g. of toluene is heated under reflux for about 8 hours after which the product is recovered and treated as described for the product of Examples I and II above. The desired product, comprising N-vinyl-N-(1,4-dichloro-2-cyclohexane-5-yl)melamine is recovered therefrom.

*Example IV*

A solution of 12 g. of 1,4-dichloro-1,3-butadiene and 20 g. of N,N-diallylmelamine in 100 g. of xylene is treated as described in Example I above. The desired product, comprising N - allyl - N - (1,4 - dichloro-2-cyclohexane-5-ylmethyl)melamine is recovered by fractional distillation under reduced pressure.

*Example V*

A solution of 27 g. of hexachlorocyclopentadiene and 20 g. of N,N-diallylmelamine in 100 g. of benzene is treated as described in Example I. The desired product, comprising N,N-bis-(1,4,5,6,7,7-hexachloro-5-norbornen-2-ylmethyl)melamine is recovered by fractional distillation under reduced pressure.

*Example VI*

An insecticidal solution is prepared by dissolving 1 g. of N - allyl - N - (1,4,5,6,7,7 - hexachloro-5-norbornen - 2-ylmethyl)melamine in 2 cc. of benzene and adding 100 cc. of water using Triton X–100 as an emulsifying agent. This solution is sprayed into a cage containing common houseflies and causes a 100% knockdown.

I claim as my invention:

1. A process which comprises reacting dialkenyl melamine at a temperature of from about 50° to about 300° C. with polyhaloalkadiene of the formula

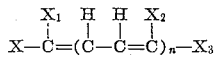

wherein $n$ is an integer of from 1 to about 6 and the X's are independently selected from the group consisting of hydrogen and halogen, at least 2 of the X's being halogen.

2. A process which comprises reacting dialkenyl melamine with hexachlorocyclopentadiene at a temperature in the range of from about 100° to about 200° C.

3. A process which comprises reacting dialkenyl melamine with 1,4-dichloro-1,3-butadiene at a temperature in the range of from about 100° to about 200° C.

4. A process which comprises reacting a molecular proportion of N,N-divinyl melamine with one molecular proportion of hexachlorocyclopentadiene at a temperature in the range of from about 100° to about 200° C., and recovering the resultant N-vinyl-N-(1,4,5,6,7,7-hexachloro-5-norbornen-2-yl)melamine.

5. A process which comprises reacting a molecular proportion of N,N-diallyl melamine with one molecular proportion of hexachlorocyclopentadiene at a temperature in the range of from about 100° to about 200° C., and recovering the resultant N-allyl-N-(1,4,5,6,7,7-hexachloro-5-norbornen-2-ylmethyl)melamine.

6. A process which comprises reacting a molecular proportion of N,N-divinyl melamine with one molecular proportion of 1,4-dichloro-1,3-butadiene at a temperature in the range of from about 100° to about 200° C., and recovering the resultant N-vinyl-N-(1,4-dichloro-2-cyclohexen-5-yl)melamine.

7. A process which comprises reacting a molecular proportion of N,N-diallyl melamine with one molecular proportion of 1,4-dichloro-1,3-butadiene at a temperature in the range of from about 100° to about 200° C., and recovering the resultant N-allyl-N-(1,4-dichloro-2-cyclohexen-5-ylmethyl)melamine.

8. A process which comprises reacting a molecular proportion of N,N-diallyl melamine with two molecular proportions of hexachlorocyclopentadiene at a temperature in the range of from about 100° to about 200° C., and recovering the resultant N,N-bis-(1,4,5,6,7,7-hexachloro-5-norbornen-2-ylmethyl)melamine.

9. N-polyhalocycloalkenic derivative of dialkenyl melamine.

10. N-vinyl-N-(1,4,5,6,7,7-hexachloro-5-norbornen - 2-yl)melamine.

11. N - allyl - N - (1,4,5,6,7,7 - hexachloro - 5 - norbornen-2-ylmethyl)melamine.

12. N - vinyl - N - (1,4 - dichloro - 2 - cyclohexen - 5-yl)melamine.

13. N-allyl - N - (1,4 - dichloro - 2 - cyclohexen - 5-ylmethyl)-melamine.

14. N,N - bis - (1,4,5,6,7,7 - hexachloro - 5 - norbornen-2-ylmethyl)melamine.

No references cited.